(12) United States Patent
Alghamdi (10) Patent No.: US 11,655,930 B2
(45) Date of Patent: May 23, 2023

(54) REDUCING THE RISK OF CORROSION IN PIPELINES

(71) Applicant: Saudi Arabian Oil Company, Dhahran (SA)

(72) Inventor: Tariq Abdulwahed Ali Alghamdi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/012,612

(22) Filed: Sep. 4, 2020

(65) Prior Publication Data

US 2021/0071807 A1 Mar. 11, 2021

Related U.S. Application Data

(60) Provisional application No. 62/896,936, filed on Sep. 6, 2019, provisional application No. 62/896,941, filed on Sep. 6, 2019.

(51) Int. Cl.
*F16L 55/00* (2006.01)
*F16L 58/04* (2006.01)
(Continued)

(52) U.S. Cl.
CPC .............. *F16L 58/04* (2013.01); *C23F 11/12* (2013.01); *F16L 9/14* (2013.01); *F16L 9/22* (2013.01);
(Continued)

(58) Field of Classification Search
CPC ..... F16L 58/04; F16L 9/14; F16L 9/22; F16L 58/08; F16L 58/181
(Continued)

(56) References Cited

U.S. PATENT DOCUMENTS 2,111,791 A 3/1938 Larson
2,209,290 A * 7/1940 Watts ............... B01J 19/02
220/567.2

(Continued)

FOREIGN PATENT DOCUMENTS

CN 1590587 3/2005
CN 104075047 10/2014
(Continued)

OTHER PUBLICATIONS www.cewindia.com [online], "Advancement in Internal Field Joint Coating System," available on or before Sep. 22, 2017, via Internet Archive: Wayback Machine URL <https://web.archive.org/web/20170922061003/http://www.cewindia.com/k_b_singh_forward_focus.html>, retrieved on Apr. 24, 2019, via URL <http://www.cewindia.com/k_b_singh_forward_focus.html>, 1 page.

(Continued)

*Primary Examiner* — James F Hook
(74) *Attorney, Agent, or Firm* — Fish & Richardson P.C.

(57) ABSTRACT

A tubular includes a carbon steel main body defining a first flow passage. The carbon steel main body includes a first end and a second end. The carbon steel main body includes a beveled edge at the first end of the carbon steel main body. A corrosion resistant pup defines a second flow passage in-line with the first flow passage. The corrosion resistant pup includes a substantially same inner diameter and outer diameter as the carbon steel main body. The corrosion resistant pup includes a first end and a second end. The corrosion resistant pup includes a first beveled edge at the first end. The corrosion resistant pup is connected to the carbon steel main body by a weld along the beveled edge of the carbon steel main body and the beveled edge of the corrosion resistant pup.

20 Claims, 7 Drawing Sheets

(51) Int. Cl.
*C23F 11/12* (2006.01)
*F16L 9/14* (2006.01)
*F16L 9/22* (2006.01)
*F16L 58/08* (2006.01)
*F16L 58/18* (2006.01)
*B23K 101/10* (2006.01)
*E21B 17/08* (2006.01)

(52) U.S. Cl.
CPC ............ *F16L 58/08* (2013.01); *F16L 58/181* (2013.01); *B23K 2101/10* (2018.08); *E21B 17/08* (2013.01)

(58) Field of Classification Search
USPC .................................. 138/36, 142, 146, 155
See application file for complete search history.

(56) References Cited

U.S. PATENT DOCUMENTS

| | | | |
|---|---|---|---|
| 3,135,047 A * | 6/1964 | Houser | B23K 9/035 228/216 |
| 3,467,410 A | 9/1969 | Chandler | |
| 3,508,766 A * | 4/1970 | Kessler | F16L 13/0263 285/21.1 |
| 3,707,450 A | 12/1972 | Townsend | |
| 4,357,745 A * | 11/1982 | Chlebowski | F16L 13/0263 29/460 |
| 4,386,629 A * | 6/1983 | Cook | F16L 47/22 138/103 |
| 4,542,846 A | 9/1985 | Matsui et al. | |
| 4,611,833 A | 9/1986 | Lescaut | |
| 4,883,292 A | 11/1989 | Kuroki | |
| 5,009,737 A | 4/1991 | Lescaut | |
| 5,104,152 A * | 4/1992 | Galfant | F16L 58/181 285/288.1 |
| 5,108,809 A | 4/1992 | Patil | |
| 5,348,211 A * | 9/1994 | White | F16L 58/181 228/120 |
| 5,714,093 A | 2/1998 | Heimann | |
| 5,988,691 A * | 11/1999 | Cruickshank | F16L 13/0263 285/55 |
| 6,773,774 B1 | 8/2004 | Crook | |
| 7,169,480 B2 | 1/2007 | Matsubara et al. | |
| 7,897,267 B2 | 3/2011 | Hoyt et al. | |
| 8,366,351 B2 | 2/2013 | Rocher | |
| 2002/0005223 A1 | 1/2002 | Capagna et al. | |
| 2002/0038954 A1* | 4/2002 | Andreoli | F16L 13/0227 285/288.1 |
| 2005/0166987 A1 | 8/2005 | Matsubara et al. | |
| 2009/0252986 A1 | 10/2009 | Owen et al. | |
| 2013/0019986 A1* | 1/2013 | Dorsch | F16L 58/181 138/155 |
| 2013/0136540 A1 | 5/2013 | Jones et al. | |
| 2014/0251792 A1 | 9/2014 | Funahashi | |
| 2015/0226365 A1 | 8/2015 | Alexandre et al. | |
| 2018/0119850 A1* | 5/2018 | Barnes | F16L 59/20 |
| 2019/0145570 A1 | 5/2019 | Raghunathan et al. | |
| 2021/0071806 A1 | 3/2021 | Abdulwahed et al. | |

FOREIGN PATENT DOCUMENTS

| | | |
|---|---|---|
| CN | 103862145 | 3/2016 |
| CN | 105952985 | 9/2016 |
| FR | 2438788 | 5/1980 |
| GB | 2264764 | 9/1993 |
| GB | 2521190 | 6/2015 |
| WO | WO 2006069414 | 7/2006 |
| WO | WO 2008077312 | 7/2008 |
| WO | WO 2009073196 | 6/2009 |
| WO | WO 2018052311 | 3/2018 |

OTHER PUBLICATIONS relisleeve.com [online], "Reli Sleeve: Insert sleeve for internally coated steel pipes," available on or before Feb. 10, 2015, via Internet Archive: Wayback Machine URL <https://web.archive.org/web/20150210010057/https://www.relisleeve.com/pipe-sleeve.html>, retrieved May 29, 2019, URL <https://www.relisleeve.com/pipe-sleeve.html>, 5 pages.

PCT International Search Report and Written Opinion in International Appln. No. PCT/US2020/049328, dated Oct. 27, 2020, 15 pages.

PCT International Search Report and Written Opinion in International Appln. No. PCT/US2020/049329, dated Oct. 26, 2020, 14 pages.

GCC Examination Report in GCC Appln. No. GC 2020-40423, dated Sep. 30, 2021, 5 pages.

GCC Examination Report in GCC Appln. No. GC 2020-40422, dated Sep. 29, 2021, 3 pages.

* cited by examiner

REDUCING THE RISK OF CORROSION IN PIPELINES

CROSS REFERENCE

This disclosure and claims the benefit of priority to U.S. Provisional Patent Application No. 62/896,936, filed Sep. 6, 2019, and U.S. Provisional Patent Application No. 62/896,941, filed Sep. 6, 2019, the contents of both of which are incorporated by reference herein.

TECHNICAL FILED

This disclosure relates to constructing internally coated pipelines and other long sections of pipe.

BACKGROUND

Extended length fluid conduits, such as pipelines, are constructed from several individual tubulars. Each individual tubular is typically constructed of carbon steel materials. The internal (wetted) surfaces of each individual tubular are coated, if required, to mitigate corrosion concerns during operation. The internal coating is applied under controlled conditions within a fabrication shop, but the individual, coated tubulars are welded together in the field. The field welding causes damage to the factory applied coating at pipe end joints, so a new coat is added in the field once the weld is completed to ensure that none of the piping internals are left uncoated. Such an application is often performed by a robotic crawler operated by a field technician. This process is repeated for each individual tubular during field construction.

SUMMARY

This disclosure describes technologies relating to reducing the risk of corrosion in pipelines.

An example implementation of the subject matter described within this disclosure is a method with the following features. A tubular includes a carbon steel main body defining a first flow passage. The carbon steel main body includes a first end and a second end. The carbon steel main body includes a beveled edge at the first end of the carbon steel main body. A corrosion resistant pup defines a second flow passage in-line with the first flow passage. The corrosion resistant pup includes a substantially same inner diameter and outer diameter as the carbon steel main body. The corrosion resistant pup includes a first end and a second end. The corrosion resistant pup includes a first beveled edge at the first end. The corrosion resistant pup is connected to the carbon steel main body by a weld along the beveled edge of the carbon steel main body and the beveled edge of the corrosion resistant pup. A galvanic protection system is configured to reduce galvanic corrosion between the carbon steel and the corrosion resistant cladding.

Aspects of the example implementation, which can be combined with the example implementation alone or in combination, include the following. An epoxy coating extends along an interior surface of the tubular.

Aspects of the example implementation, which can be combined with the example implementation alone or in combination, include the following. The weld is a full penetration weld.

Aspects of the example implementation, which can be combined with the example implementation alone or in combination, include the following. The weld includes a corrosion resistant alloy.

Aspects of the example implementation, which can be combined with the example implementation alone or in combination, include the following. The corrosion resistant alloy is metallurgically compatible with the carbon steel main body and the corrosion resistant pup.

Aspects of the example implementation, which can be combined with the example implementation alone or in combination, include the following. The corrosion resistant pup is substantially four to seven inches in length.

Aspects of the example implementation, which can be combined with the example implementation alone or in combination, include the following. The corrosion resistant pup includes alloy 625.

Aspects of the example implementation, which can be combined with the example implementation alone or in combination, include the following. The carbon steel main body is a first carbon steel main body and the corrosion resistant pup is a first corrosion resistant pup. A second carbon steel main body defines a third flow passage in line with the first flow passage and the second flow passage. The second carbon steel main body includes a first end and a second end. The second carbon steel main body includes a first beveled edge at the first end. A second corrosion resistant pup defines a fourth flow passage in-line with the first flow passage, the second flow passage, and the third flow passage. The second corrosion resistant pup includes a first end and a second end. The corrosion resistant pup includes a first beveled edge at the first end of the corrosion resistant pup and a second beveled edge at the second end of the corrosion resistant pup. The corrosion resistant pup is connected to the carbon steel main body by a weld along the beveled edge of the carbon steel main body and the first beveled edge of the second corrosion resistant pup. The second corrosion resistant pup is connected to the first corrosion resistant pup by a weld along the beveled edge of the first corrosion resistant pup and the second beveled edge of the second corrosion resistant pup.

An example implementation of the subject matter described within this disclosure is a method of manufacturing a tubular. The method includes the following features. A carbon steel tubular body with an end is received. A corrosion resistant pup is attached to the end of the carbon steel tubular. An epoxy coating is deposited along an inner surface of the carbon steel tubular body and the corrosion resistant pup. Galvanic corrosion between the carbon steel and the corrosion resistant cladding is reduced by a galvanic protection system.

Aspects of the example implementation, which can be combined with the example implementation alone or in combination, include the following. The corrosion resistant pup includes alloy 625.

Aspects of the example implementation, which can be combined with the example implementation alone or in combination, include the following. The end of the carbon steel tubular body and an end of the corrosion resistant pup are beveled prior to attaching the corrosion resistant pup to the end of the carbon steel tubular.

Aspects of the example implementation, which can be combined with the example implementation alone or in combination, include the following. Attaching a corrosion resistant pup to the end of the carbon steel tubular includes positioning the beveled end of the carbon steel tubular body to be adjacent to the beveled end of the corrosion resistant pup. The beveled end of the carbon steel tubular body is welded to the beveled end of the corrosion resistant pup with a girth weld.

Aspects of the example implementation, which can be combined with the example implementation alone or in combination, include the following. The girth weld is a full penetration weld.

Aspects of the example implementation, which can be combined with the example implementation alone or in combination, include the following. The weld includes a corrosion resistant alloy.

Aspects of the example implementation, which can be combined with the example implementation alone or in combination, include the following. The corrosion resistant alloy is metallurgically compatible with the carbon steel tubular body and the corrosion resistant pup.

Aspects of the example implementation, which can be combined with the example implementation alone or in combination, include the following. The carbon steel tubular body is a first carbon steel tubular body and the corrosion resistant pup is a first corrosion resistant pup. A second carbon steel tubular body, substantially identical to the first carbon steel tubular body, is received. A second corrosion resistant pup is attached to the end of the second carbon steel tubular. An epoxy coating is deposited along an inner surface of the second carbon steel tubular body and the second corrosion resistant pup. The first corrosion resistant pup is attached to the second corrosion resistant pup.

Aspects of the example implementation, which can be combined with the example implementation alone or in combination, include the following. Attaching the first corrosion resistant pup to the second corrosion resistant pup includes welding the first corrosion resistant pup to the second corrosion resistant pup.

An example implementation of the subject matter describes within this disclosure is a pipeline with the following features. A first tubular includes a first carbon steel main body defining a first flow passage. The first carbon steel main body includes a first end and a second end. The first carbon steel main body includes a first beveled edge at the first end. A first corrosion resistant pup defines a second flow passage in-line with the first flow passage. The first corrosion resistant pup includes a substantially same inner diameter and outer diameter as the carbon steel main body. The first corrosion resistant pup includes a first end and a second end. The first corrosion resistant pup includes a first beveled edge at the first end. The first corrosion resistant pup is connected to the first carbon steel main body by a weld along the beveled edge of the first carbon steel main body and the beveled edge of the first corrosion resistant pup. An epoxy coating extends along an interior surface of the first tubular. A second tubular includes a second carbon steel main body defining a third flow passage in line with the first flow passage and the second flow passage. The second carbon steel main body includes a first end and a second end. The second carbon steel main body includes a first beveled edge at the first end. A second corrosion resistant pup defines a fourth flow passage in-line with the first flow passage, the second flow passage, and the third flow passage. The corrosion resistant pup includes a first end and a second end. The corrosion resistant pup includes a first beveled edge at the first end of the corrosion resistant pup and a second beveled edge at the second end of the corrosion resistant pup. The corrosion resistant pup is connected to the carbon steel main body by a weld along the beveled edge of the carbon steel main body and the first beveled edge of the second corrosion resistant pup. The second resistant corrosion pup is connected to the first corrosion resistant pup by a weld along the beveled edge of the first corrosion resistant pup and the second beveled edge of the second corrosion resistant pup. An epoxy extends coating along an interior surface of the first tubular. A galvanic protection system is configured to reduce galvanic corrosion between the carbon steel and the corrosion resistant cladding in the first tubular and the second tubular.

Aspects of the example implementation, which can be combined with the example implementation alone or in combination, include the following. The first corrosion resistant pup and the second corrosion resistant pup are each substantially four to seven inches in length.

Aspects of the example implementation, which can be combined with the example implementation alone or in combination, include the following. The first corrosion resistant pup and the second corrosion resistant pup comprise alloy 625.

An example implementation of the subject matter described within this disclosure is a pipeline with the following features. A first tubular and a second tubular are welded in series with one another. An interior surface of both the first tubular and the second tubular, proximal to the weld, include a corrosion resistant alloy.

Particular implementations of the subject matter described in this disclosure can be implemented to realize one or more of the following advantages. The subject matter described herein, describes using corrosion resistant materials (weld overlay or solid piece of materials) at pipe ends to avoid application of field-applied internal coating. This practical solution results in major schedule reduction in the pipeline construction phase by avoiding coating appreciation, inspection, and possible reworks of field welds and coatings.

The details of one or more implementations of the subject matter described in this disclosure are set forth in the accompanying drawings and the description. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

For water injection or multiphase oil and gas pipelines, internal corrosion contributes to failures and leaks. The application of Field Joint Coating (FJC) to girth welds becomes a challenge due to difficulty of robotic crawler access especially for longer strings of pipes (hundreds of meters) or curved (non-straight) pipe configurations as the field welding progress is faster than the coating and curing operations. Another challenge of FJC is attributed to the limited number of coating service providers for straight pipes using robotic crawlers. Although rigorous field cleaning and coating inspections are conducted on the internally coated areas, the field coating quality is inferior to the factory applied coating as temperatures, humidity, and cleanliness cannot be as easily controlled in the field. This can result in coating thicknesses being outside of desired specifications, improper bonding to the weld, or a combination.

This disclosure describes a tubular arrangement for long fluid conduits, such as pipelines, that addresses these concerns. In general, this disclosure describes using a first tubular and a second tubular welded in series. An interior surface of both of the tubulars includes a corrosion resistant alloy near the welded connection. The corrosion resistant alloy resists corrosion without needing an application of FJC.

Figure 1:
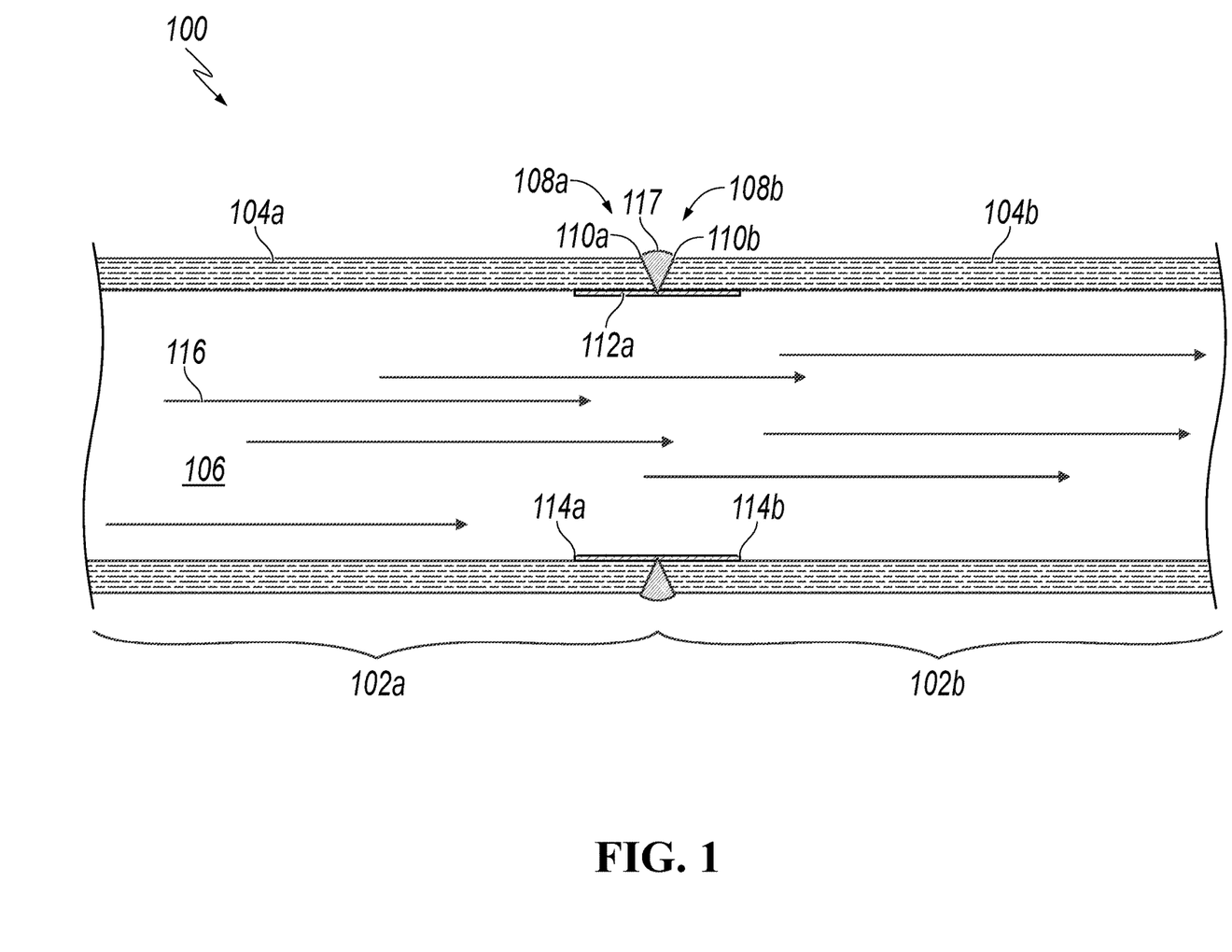
FIG. 1 is a side-cross sectional view of an example pipeline.

In some implementations, the corrosion resistant alloy is coated or cladded onto an interior surface of a main tubular near an end of the tubular to be welded. FIG. 1 is a side cross-sectional view of an example pipeline 100 in accordance with some implementations of the present disclosure. As illustrated, the pipeline 100 includes a first tubular 102a. The first tubular 102a includes a first carbon steel main body 104a that defines a flow passage 106. The first carbon steel main body 104a includes a first end 108a with a first beveled edge 110a. Near the first end 108a, a corrosion resistant cladding 112a is deposited along an inner surface of the first carbon steel main body 104a. The corrosion resistant cladding 112a extends from the first end 108a to a distance 114a into the first carbon steel main body 104a.

A coating, such as a powder epoxy or liquid glass-flake coating material, coats an interior surface of the first tubular 102a. The coating protects the interior (wetted) surface of the first tubular 102a from corrosion caused by a process fluid 116.

A second tubular 102b is substantially similar to the first tubular 102a. The second tubular includes a second carbon steel main body 104b that further defines the flow passage 106. The second carbon steel main body 104b includes a second end 108b with a second beveled edge 110b. A corrosion resistant cladding 112b is deposited along an inner surface of the second carbon steel main body 104b as well. The second corrosion resistant cladding 112b extends from the second end 108b to a distance 114b into the second carbon steel main body 104b.

Similar to the first tubular, the second tubular is coated along its interior surface with an epoxy or glass-flake coating. The coating protects the interior (wetted) surface of the first tubular 102a from corrosion caused by a process fluid 116.

The first tubular 102a and the second tubular 102b are connected by a weld 117 at the first beveled edge 110a and the second beveled edge 110b. The weld 117 is a full penetration weld. That is, the weld extends an entire wall thickness of the tubular 102 such that a portion of the weld extends to the inner (wetted) surface of the tubular 102. Such a weld is typically conducted during field installation. The weld can be deposited using manual (Shield Metal Arc Welding (SMAW) or Gas Tungsten Arc Welding (GTAW)) or automatic welding (Gas Metal Arc Welding (GMAW) or GTAW) processes. Other welding processes can be used without departing from this disclosure.

Figure 2:
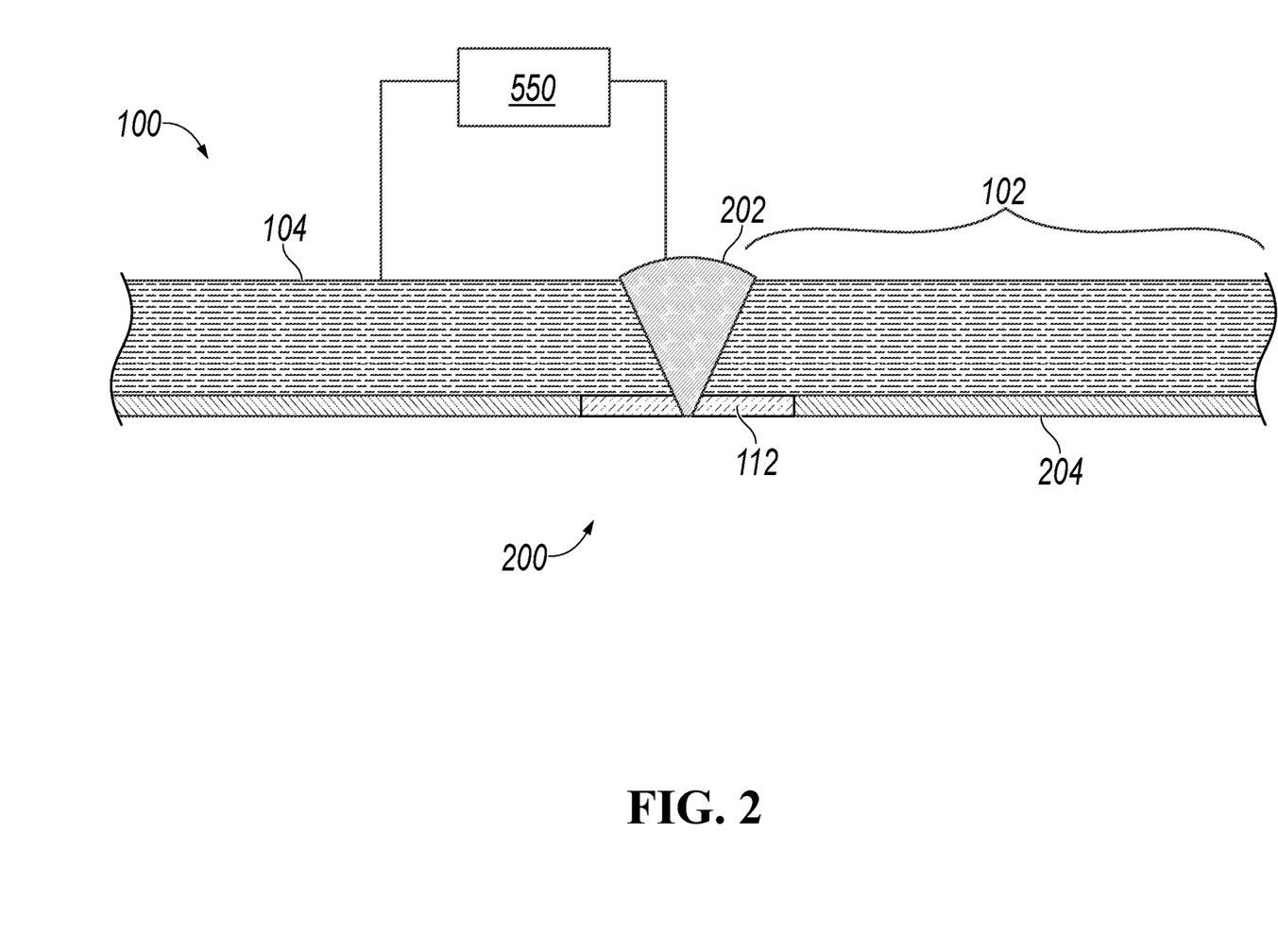
FIG. 2 is a side-cross sectional view of an example seam of the example pipeline.

FIG. 2 is a side-cross sectional view of an example seam 200 of the example pipeline 100. The seam 200 includes the full penetration weld 117, such as a girth weld 202. While a girth weld 202 is primarily mentioned and described within this disclosure, other types of welds can be used so long as the pressure and structural integrity of the completed pipeline 100 is intact. The girth weld 202 includes an alloy that is compatible with both the corrosion resistant cladding 112 and the carbon steel tubular body 104.

As previously described, the cladding 112 extends from an end of each tubular 102 to a distance or length 114 within each tubular 102. In some implementations, the distance 114 into each tubular is substantially the same (within standard manufacturing tolerances). In general, the cladding 112 extends a sufficient distance to clad the entire heat effected zone of the weld 202 (or 117), and adjacent base metal which are thermally affected, as that is where the most damage to the epoxy 204 is likely to occur during field welding.

Figure 3:
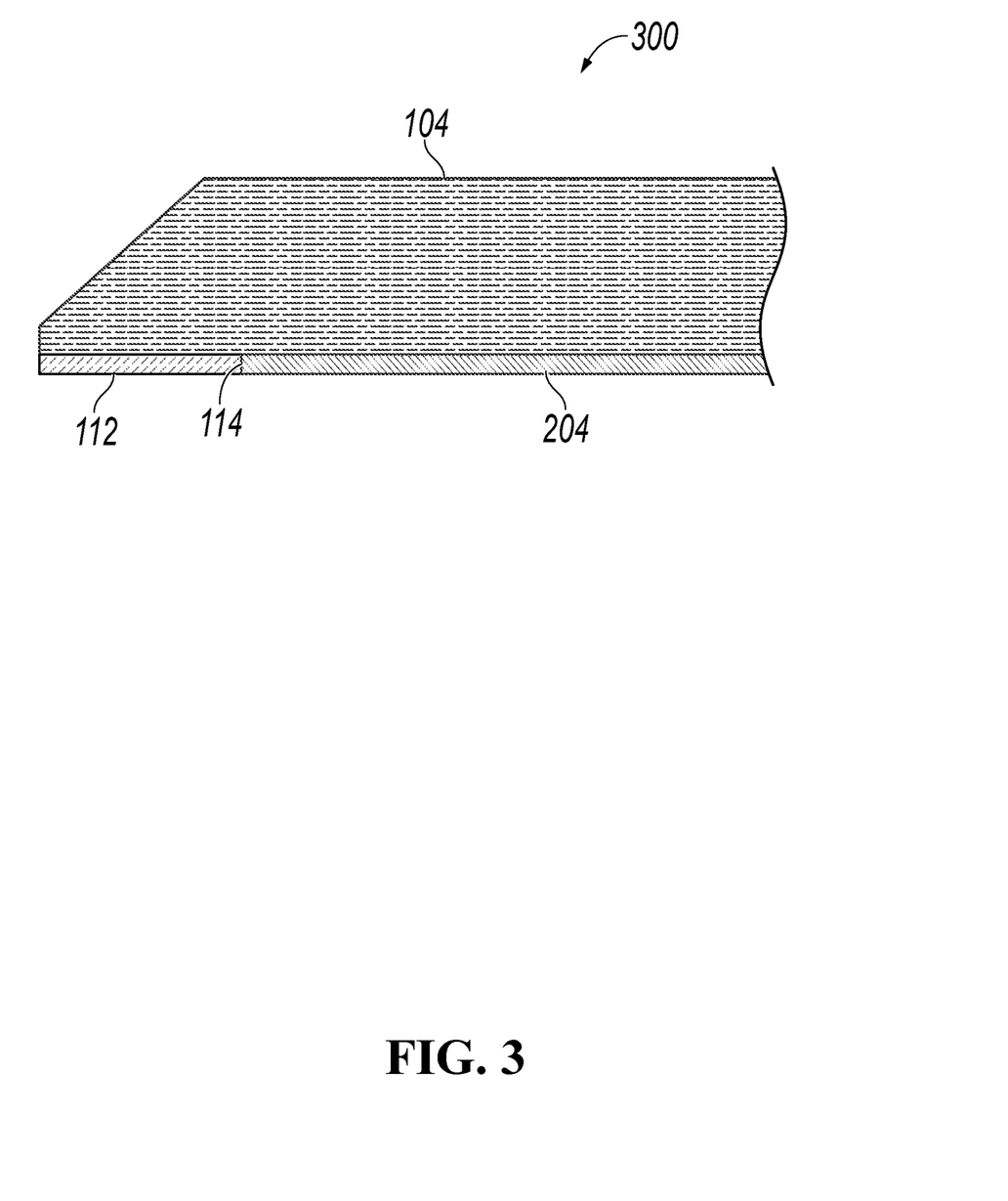
FIG. 3 is an example tubular arrangement that can be used with aspects of this disclosure.

FIG. 3 is an example tubular arrangement 300 that can be used with aspects of this disclosure. In some implementations, the corrosion resistant cladding 112 extends substantially four to seven inches (within manufacturing tolerances) into the carbon steel body. In some implementations, other lengths of cladding can be used. Criteria for the length of the cladding 112 are described throughout the disclosure. Several different corrosion resistant cladding options can be used, for example, alloy 625; however, different corrosion resistant claddings can be chosen based on the service of the pipeline. In some implementations, the corrosion resistant cladding 112 is deposited as a weld overlay using manual welding, automatic welding, or a combination. Multiple passes can be used to deposit several cladding layers with such a method, for example, two layers of overlay can be used. Other deposition methods can be used without departing from this disclosure. For example a single layer Electroslag Welding (ESW) technique can be used. In some implementations, the cladding is at least three millimeters thick.

To reduce friction loss, the interface between the epoxy coating 204 and the corrosion resistant cladding 112 should be smooth. That is, the inner surface of the corrosion resistant cladding 112 smoothly transitions to the inner surface of the epoxy 204 along the inner surface of the carbon steel main body 104. That is, the interface between the coating 204 and the corrosion resistant cladding 112 should have few, if any, discontinuities that can create turbulence within the tubular 102, which could lead to a coating failure. For example, the interface can include tapering angles in lieu of hard, right angles. The cladding can be at least three millimeters thick and tappers smooth to the adjacent base metal, for example, with a slope not steeper than 1:4, to avoid sharp edge at the end of cladding. After the cladding is applied, the coating materials are then applied in a controlled facility to extend at least partially over the cladding. The thickness of the coating layer can be as high as 750 microns of dry film epoxy coating or as high as 1000 microns of liquid glass-flake type coating.

Figure 4:
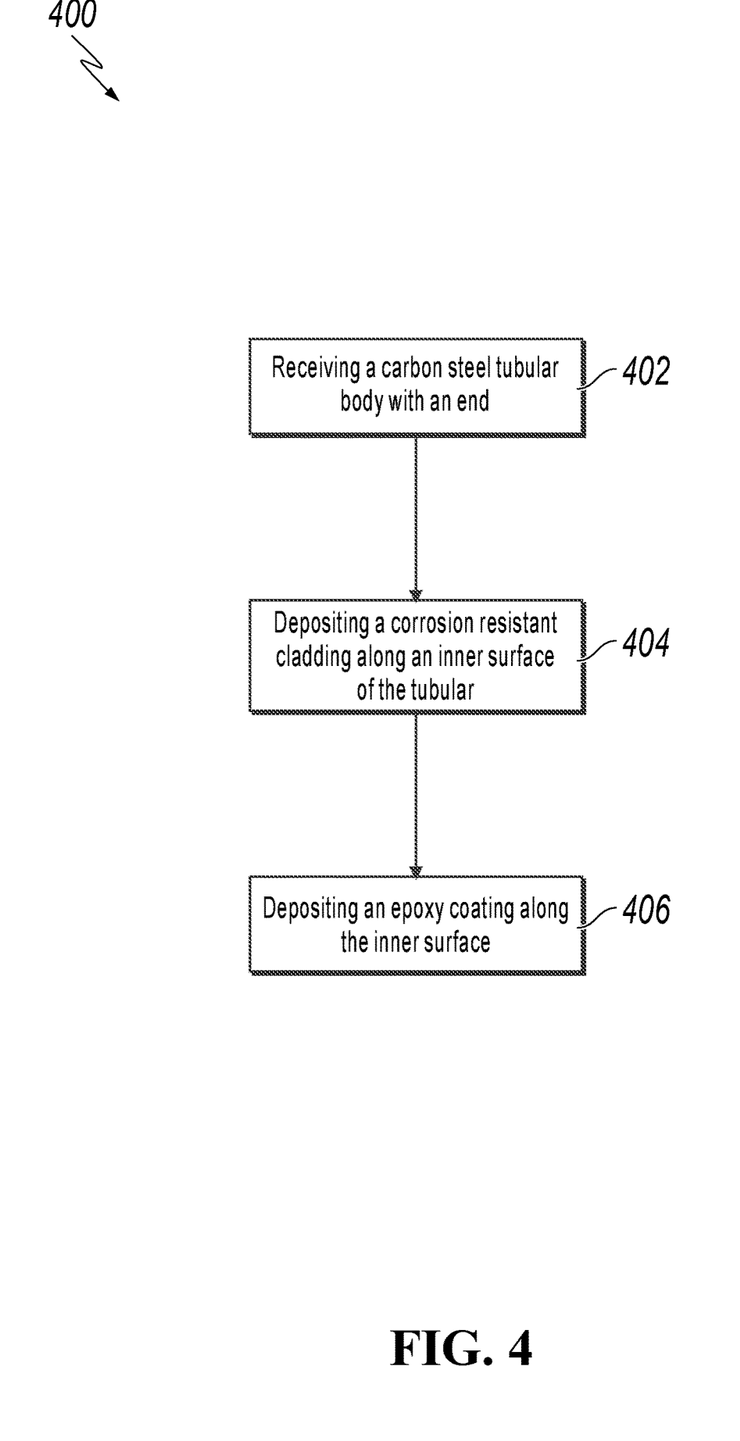
FIG. 4 is a flowchart of a method of manufacturing a tubular that can be used with aspects of this disclosure.

FIG. 4 is a flowchart of a method 400 of manufacturing a tubular that can be used with aspects of this disclosure. At 402, a carbon steel tubular body 104 is received. At 404, a corrosion resistant cladding 112 is deposited along an inner surface of the carbon steel tubular body 104. The corrosion resistant cladding 112 extends a distance 114 along the inner surface of the carbon steel tubular body 104 from the end of the carbon steel tubular body 104. In some implementations, the corrosion resistant cladding 112 is deposited with a weld overlay. In some implementations, two layers of weld overlay can be used. In some implementations, the corrosion resistant cladding comprises alloy 625. At 406, an epoxy coating is deposited along the inner surface of the carbon steel tubular body and the corrosion resistant cladding. The coating is partially applied over the cladding material as an overlap. For example, approximately a five inch gap (within manufacturing tolerances) from the end of the pipe can be left uncoated.

In some implementations, an end of the carbon steel tubular body can be beveled to accommodate a weld. Other types of welds with different preparation steps can be used without departing from this disclosure. In some implementations, a second carbon steel tubular body, substantially identical to the first carbon steel tubular body, can be received. A bevel can be added to an end of both the first carbon steel tubular body and the second carbon steel tubular body. The first carbon steel tubular can then be welded to the second carbon steel tubular at the bevel of the first carbon steel tubular and the bevel of the second carbon steel tubular. In some implementations, the weld can include a girth weld. In some implementations, the weld is a full penetration weld. In some implementations, the weld can include a corrosion resistant alloy, such as alloy 625. Regardless of the material used in the weld, the weld material is metallurgically compatible with the carbon steel and the corrosion resistant cladding.

In another implementation, a separate corrosion resistant tubular, such as a short pup, can be welded onto the end of a carbon steel tubular prior to field welding the tubulars together. That is, corrosion resistant alloys are attached at the ends of carbon steel double jointed pipeline which can be subsequently internally coated with epoxy under shop conditions. The corrosion resistant alloy pieced at each pipe end are welded first to carbon steel pipes. The pipe is then internally coated in the factory. The coating is applied over the weld and extends at least partially into the corrosion resistant alloy piece. The epoxy is aimed to enhance the flow characteristics of the production fluid traveling through the pipeline, and the epoxy protects an inner surface of the pipeline from corrosion. The corrosion resistant alloy piece is then welded in the field to adjacent corrosion resistant alloy mating materials using a compatible corrosion resistant alloy weld filler and process.

Figure 5:
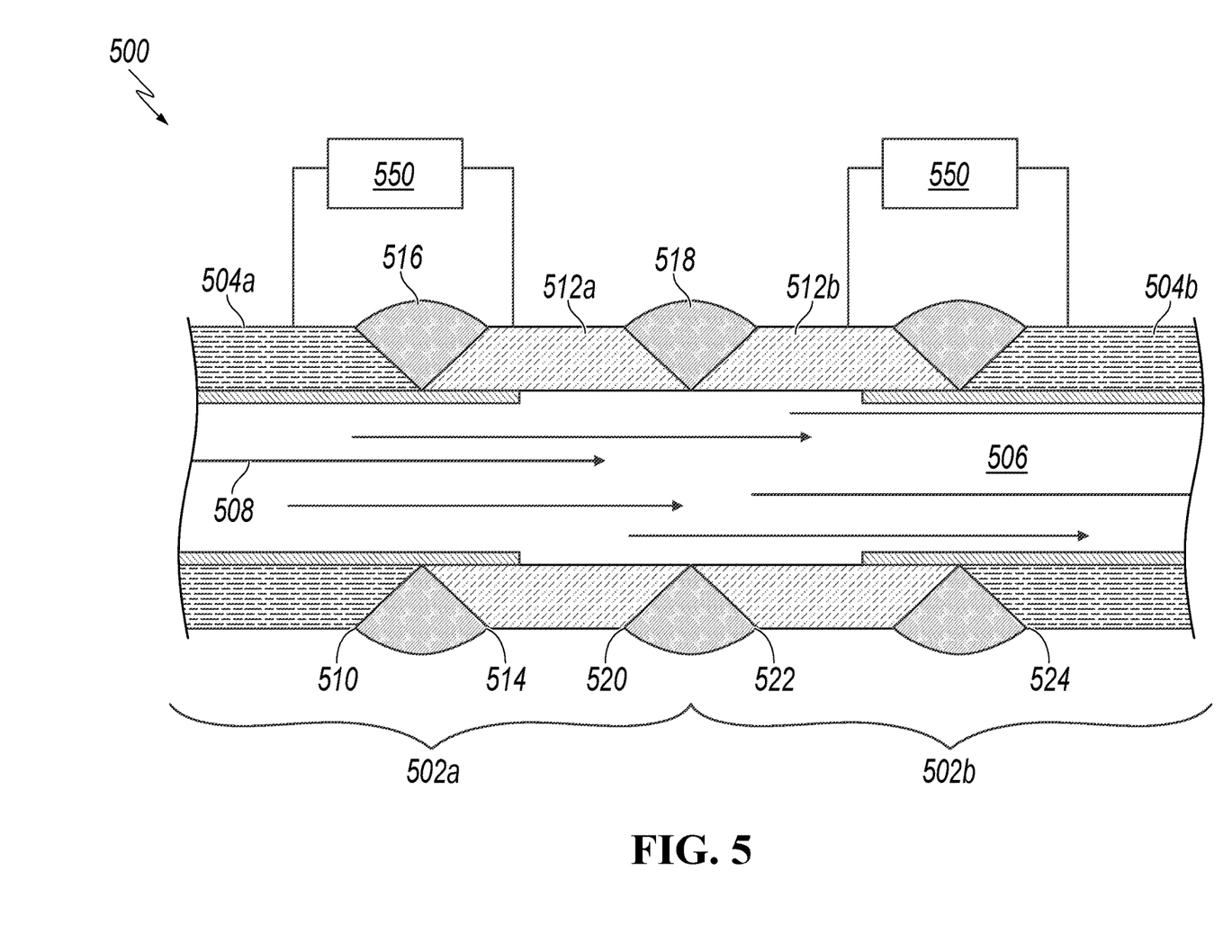
FIG. 5 is a side-cross sectional view of an example pipeline.

FIG. 5 is a side-cross sectional view of such an example pipeline 500. As illustrated, the pipeline 500 includes a first tubular 502a with a first carbon steel main 504a body that defines a flow passage 506 through which process fluid 508 can flow. The first carbon steel main body 504a has a first end and a second end. The first carbon steel main body 504a includes a first beveled edge 510 at the first end.

A first corrosion resistant pup 512a further defines the flow passage 506. The first corrosion resistant pup 512a has substantially the same inner diameter and outer diameter as the carbon steel main body 504a (within typical manufacturing tolerances). The first corrosion resistant pup includes a first end and a second end. The first corrosion resistant pup 512a has a first beveled edge 514 at the first end. The first corrosion resistant pup 512a is connected to the first carbon steel main body 504 by a dissimilar metal weld 516 along the beveled edge 510 of the first carbon steel main body 504a and the beveled edge 514 of the first corrosion resistant pup 512a.

A second tubular 502b is substantially similar to the first tubular 502a. The second tubular 502b includes a second carbon steel main body 504b and a second corrosion resistant pup 512b. The second carbon steel main body 504b and the second corrosion resistant pup 512b further define the flow passage 106. The second corrosion resistant pup 512b is connected to the first corrosion resistant pup 512a by a similar metal weld 518 along a second beveled edge 520 of the first corrosion resistant pup 512a and a similar beveled edge 522 of the second corrosion resistant pup 512b. Each corrosion resistant pup 512 is substantially an equivalent length within standard manufacturing tolerances.

An epoxy coating 524 is distributed along an interior surface of the first tubular 502a and the second tubular 502b. The epoxy coating 524 extends along an inner surface of each carbon steel main body 504, each dissimilar metal weld 516, and at least a portion of each corrosion resistant pup 512.

Figure 6:
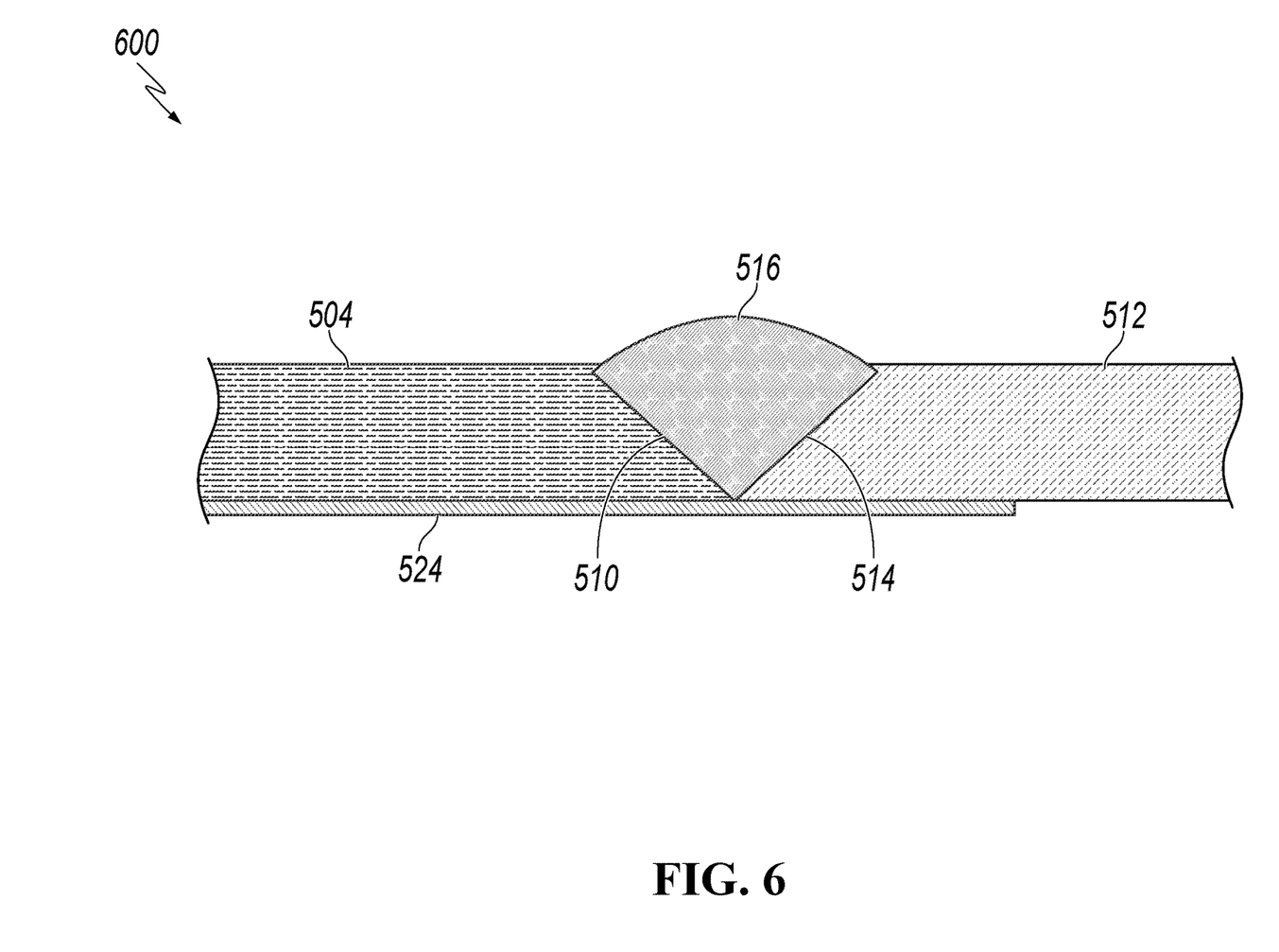
FIG. 6 is an example tubular arrangement that can be used with aspects of this disclosure.

FIG. 6 is an example tubular arrangement 600 that can be used with aspects of this disclosure. As illustrated, a carbon steel main body 504 defines a flow passage 506 (FIG. 5). The carbon steel main body 504 includes a beveled edge 510 at the first end of the carbon steel main body 504. A corrosion resistant pup 512 further defines the flow passage 506. In some implementations, the corrosion resistant pup 512 includes alloy 625. While primarily described as including alloy 625, any weld-able, corrosion resistant alloy of sufficient strength can be used without departing from this disclosure.

The corrosion resistant pup 512 has the same wall thickness as the carbon steel main body 504 within standard manufacturing tolerances. The wall thickness of the specified main body is determined by the design and engineering office during the design phase based on the internal pressure, pipe diameter, and pipe strength. In all cases, the corrosion resistance piece 512 thickness and diameter shall be selected based on the predetermined wall thickness and diameter of the original carbon steel pipe. The strength of the alloy material 512 shall be selected to be equal or higher than the strength of the original carbon steel pipe. In general, the corrosion resistant pup 512 is long enough to fully contain a heat affected zone from a weld at both ends of the corrosion resistant pup 512 and to allow partial overlap coating. This length of pup piece is practically coated to allow conducting field welding without extending the heat to the factory coating. The overlap coating extends over the pup piece 512 such that substantially five inches (within manufacturing tolerances) of the corrosion resistant pup 512 remains uncoated toward the end of corrosion resistant pup 512 where weld is made. For example, in some implementations, the corrosion resistant pup 512 is substantially four to seven inches in length within standard manufacturing tolerances. In some implementations, other lengths can be used. Wall thickness, types of welds, and composition of the pup 512 and weld material can have an effect on the desired length of the corrosion resistant pup 512. Similar to the cladding 112 of the previous implementation, each corrosion resistant pup 512 can be made of alloy 625 or another corrosion resistant material adequate for the intended service of the tubular. The corrosion resistant pup 512 includes a beveled edge 514 at one end. The corrosion resistant pup 512 is connected to the carbon steel main body 504 by a dissimilar metal weld 516 along the beveled edge 510 of the carbon steel main body 504 and the beveled edge 514 of the corrosion resistant pup 512.

The dissimilar metal weld 516 connecting the corrosion resistant pup to the carbon steel main body is a full penetration weld. For example, a girth weld can be used. As the dissimilar metal weld 516 is a full penetration weld that may come into contact with an interior fluid flow, the weld can include a corrosion resistant alloy. In general, the weld alloy is metallurgically compatible with the carbon steel main body 504 and the corrosion resistant pup 512. That is, the dissimilar metal weld 516 is able to fuse both metals to form a pressure tight seal and a structurally sound connection.

Each tubular includes an epoxy coating 524 along an interior surface of the tubular. The epoxy coating 524 is applied after the dissimilar metal weld is completed. The epoxy coating 524 covers an inner surface of the carbon steel body 504, the dissimilar metal weld 516, and at least a portion of the corrosion resistant pup 512. The similar metal weld 518 between two corrosion resistant pups (512a and 512b) in the field does not need any field epoxy applied as the pups are made from corrosion resistant materials.

Figure 7:
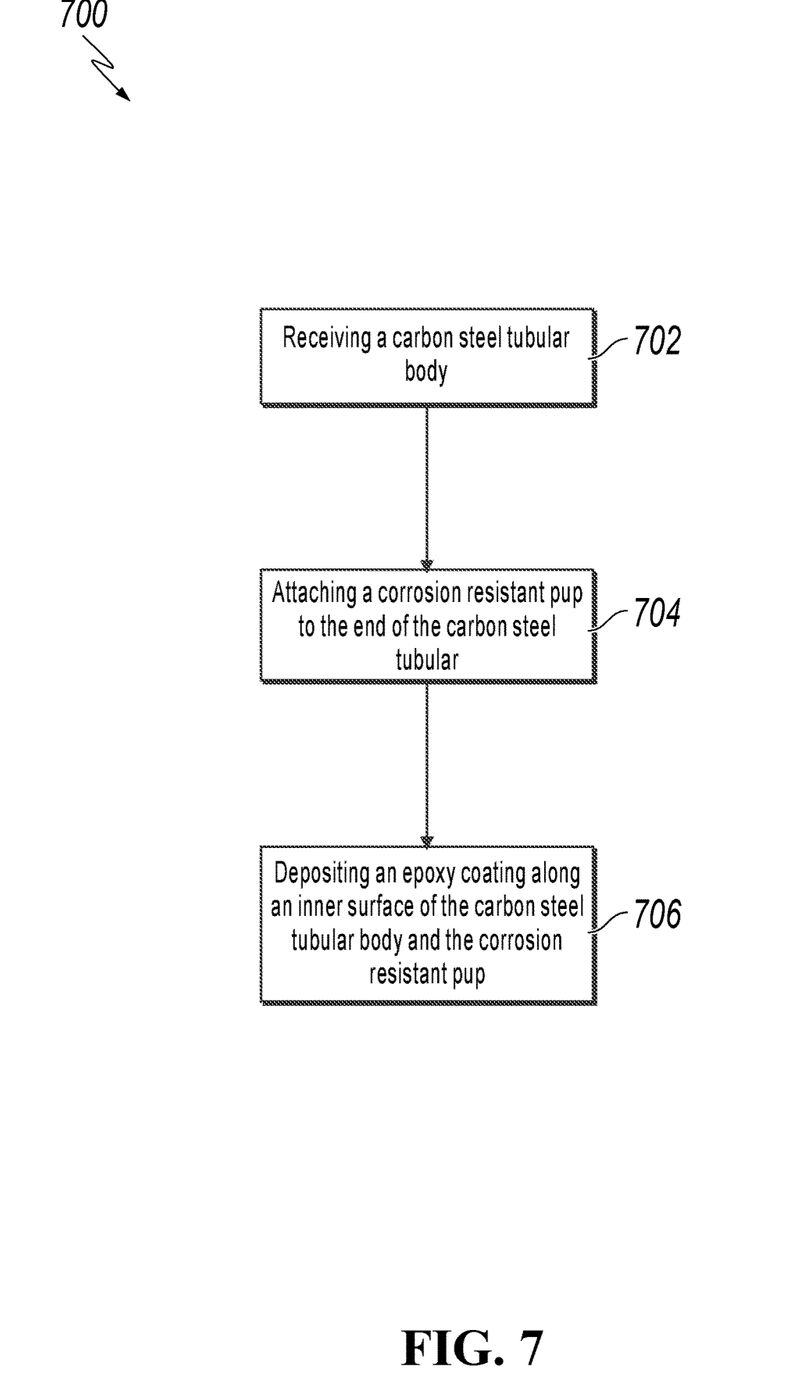
FIG. 7 is a flowchart of a method that can be used with aspects of this disclosure.

FIG. 7 is a flowchart of a method 700 of manufacturing a tubular that can be used with aspects of this disclosure. At 702, a carbon steel tubular body 504 is received. The carbon steel tubular body 504 has an end. The end of the carbon steel tubular body 504 and an end of the corrosion resistant pup 512 are beveled prior to attaching the corrosion resistant pup 512 to the end of the carbon steel tubular 504.

At 704, a corrosion resistant pup 512 is attached to the end of the carbon steel tubular 504. The beveled end of the carbon steel tubular body 504 is positioned to be adjacent to the beveled end of the corrosion resistant pup 512. The beveled end of the carbon steel tubular body 504 is then welded to the beveled end of the corrosion resistant pup 512 with a full penetration weld, such as a girth weld 516.

In some implementations, the corrosion resistant pup 512 includes alloy 625. In some implementations, other corrosion resistant materials can be used. The dissimilar metal weld 516 includes a corrosion resistant alloy as well since the weld 516 is a full penetration weld, and a portion of the weld 516 may be exposed to a wetted portion of the tubular. Regardless of the alloys used, the corrosion resistant alloy of the weld 516 is metallurgically compatible with the carbon steel tubular body and the corrosion resistant pup. That is, complete fusion occurs during the welding process to allow for a pressure-tight weld. The strength of the weld joint is substantially greater than or equal to the strength of the carbon steel tubular body. At 706, an epoxy coating 524 is deposited along an inner surface of the carbon steel tubular body 504 and the corrosion resistant pup 512. The epoxy coating 524 extends to cover the interior of the carbon steel tubular 504, the full penetration weld 516, and at least a portion of the corrosion resistant pup 512.

After each tubular is constructed, they can be assembled in the field to create an extended tubular, such as a pipeline. In such an instance, a second tubular, constructed identically to any of the previously described tubulars, is received. The first tubular and the second tubular are attached end-to-end. More specifically, a corrosion resistant pup of the first tubular is attached to a corrosion resistant pup of the second tubular. Attaching the first corrosion resistant pup to the second corrosion resistant pup includes welding the first corrosion resistant pup to the second corrosion resistant pup. This particular weld 518 is a full penetration weld, such as a girth weld. The weld 518 includes a corrosion resistant alloy as well since the weld is a full penetration weld, and a portion of the weld is exposed to a wetted portion of the tubular. This penetrative portion of the weld 518 does not require a field application of epoxy as it includes a corrosion resistant alloy.

As dissimilar metals are adjacent to one another, there is the possibility of galvanic corrosion. The severity of such corrosion is dependent upon environmental factors and the electric potential between the carbon steel and corrosion resistant alloy. In some implementations, galvanic corrosion can be mitigated or reduced with a galvanic protection system 550, such as a sacrificial anode or an impressed current catholic protection system.

While this disclosure contains many specific implementation details, these should not be construed as limitations on the scope of any inventions or of what may be claimed, but rather as descriptions of features specific to particular implementations of particular inventions. Certain features that are described in this disclosure in the context of separate implementations can also be implemented in combination in a single implementation. For example, a tubular with corrosion resistant cladding can be attached to a tubular with a corrosion resistant pup without departing from this disclosure. Conversely, various features that are described in the context of a single implementation can also be implemented in multiple implementations separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described herein should not be understood as requiring such separation in all implementations, and it should be understood that the described components and systems can generally be integrated together in a single product or packaged into multiple products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A tubular comprising:
a carbon steel main body defining a first flow passage, the carbon steel main body comprising a first end and a second end, the carbon steel main body comprising a beveled edge at the first end of the carbon steel main body, the carbon steel main body comprising carbon steel; and
a corrosion resistant pup defining a second flow passage in-line with the first flow passage, the corrosion resistant pup comprises a substantially same inner diameter and outer diameter as the carbon steel main body, the corrosion resistant pup comprising a corrosion resistant alloy through an entire thickness of the corrosion resistant pup, the corrosion resistant pup comprising a first end and a second end, the corrosion resistant pup comprising a first beveled edge at the first end, the corrosion resistant pup being connected to the carbon steel main body by a weld along the beveled edge of the carbon steel main body and the beveled edge of the corrosion resistant pup, the corrosion resistant pup comprising a metal different from the carbon steel of the carbon steel main body; and
a galvanic protection system configured to reduce galvanic corrosion between the carbon steel and the corrosion resistant pup.

2. The tubular of claim 1, further comprising:
an epoxy or glass-flake coating along an interior surface of the tubular.

3. The tubular of claim 1, wherein the weld is a full penetration weld.

4. The tubular of claim 1, wherein the weld comprises a corrosion resistant alloy.

5. The tubular of claim 4, wherein the corrosion resistant alloy is metallurgically compatible with the carbon steel main body and the corrosion resistant pup.

6. The tubular of claim 1, wherein the corrosion resistant pup is substantially four to seven inches in length.

7. The tubular of claim 1, wherein the corrosion resistant pup comprises alloy 625.

8. The tubular of claim 1, wherein the carbon steel main body is a first carbon steel main body and the corrosion resistant pup is a first corrosion resistant pup, the tubular further comprising:
 a second carbon steel main body defining a third flow passage in line with the first flow passage and the second flow passage, the second carbon steel main body comprising a first end and a second end, the second carbon steel main body comprising a first beveled edge at the first end; and
 a second corrosion resistant pup defining a fourth flow passage in-line with the first flow passage, the second flow passage, and the third flow passage, the corrosion resistant pup comprising a first end and a second end, the corrosion resistant pup comprising a first beveled edge at the first end of the corrosion resistant pup and a second beveled edge at the second end of the corrosion resistant pup, the second corrosion resistant pup being connected to the carbon steel main body by a weld along the beveled edge of the carbon steel main body and the first beveled edge of the second corrosion resistant pup, the second corrosion resistant pup being connected to the first corrosion resistant pup by a weld along the beveled edge of the first corrosion resistant pup and the second beveled edge of the second corrosion resistant pup.

9. A method of manufacturing a tubular comprising:
 receiving a carbon steel tubular body with an end, wherein the carbon steel tubular body comprises carbon steel;
 attaching a corrosion resistant pup to the end of the carbon steel tubular, the corrosion resistant pup comprising a corrosion resistant alloy through an entire thickness of the corrosion resistant pup the corrosion resistant pup comprising a metal different from the carbon steel of the carbon steel tubular body; and
 depositing an epoxy coating along an inner surface of the carbon steel tubular body and the corrosion resistant pup; and
 reducing galvanic corrosion between the carbon steel and the corrosion resistant pup using a galvanic protection system.

10. The method of claim 9, wherein the corrosion resistant pup comprises alloy 625.

11. The method of claim 9, further comprising beveling the end of the carbon steel tubular body and an end of the corrosion resistant pup prior to attaching the corrosion resistant pup to the end of the carbon steel tubular.

12. The method of claim 11, wherein attaching a corrosion resistant pup to the end of the carbon steel tubular comprises:
 positioning the beveled end of the carbon steel tubular body to be adjacent to the beveled end of the corrosion resistant pup; and
 welding the beveled end of the carbon steel tubular body to the beveled end of the corrosion resistant pup with a girth weld.

13. The method of claim 12, wherein the girth weld is a full penetration weld.

14. The method of claim 12, wherein the weld comprises a corrosion resistant alloy.

15. The method of claim 14, wherein the corrosion resistant alloy is metallurgically compatible with the carbon steel tubular body and the corrosion resistant pup.

16. The method of claim 9, wherein the carbon steel tubular body is a first carbon steel tubular body and the corrosion resistant pup is a first corrosion resistant pup, the method further comprising:
 receiving a second carbon steel tubular body substantially identical to the first carbon steel tubular body;
 attaching a second corrosion resistant pup to the end of the second carbon steel tubular;
 depositing an epoxy coating along an inner surface of the second carbon steel tubular body and the second corrosion resistant pup; and
 attaching the first corrosion resistant pup to the second corrosion resistant pup.

17. The method of claim 16, wherein attaching the first corrosion resistant pup to the second corrosion resistant pup comprises welding the first corrosion resistant pup to the second corrosion resistant pup.

18. A pipeline comprising:
 a first tubular comprising:
  a first carbon steel main body defining a first flow passage, the first carbon steel main body comprising a first end and a second end, the first carbon steel main body comprising a first beveled edge at the first end, the first carbon steel main body comprising carbon steel; and
  a first corrosion resistant pup defining a second flow passage in-line with the first flow passage, the first corrosion resistant pup comprises a substantially same inner diameter and outer diameter as the carbon steel main body, the first corrosion resistant pup comprising a corrosion resistant alloy through an entire thickness of the first corrosion resistant pup, _the first corrosion resistant pup comprising a first end and a second end, the first corrosion resistant pup comprising a first beveled edge at the first end, the first corrosion resistant pup being connected to the first carbon steel main body by a weld along the beveled edge of the first carbon steel main body and the beveled edge of the first corrosion resistant pup, the first corrosion resistant pup comprising a metal different from the carbon steel of the first carbon steel main body; and
  a glass-flake coating along an interior surface of the first tubular; and
 a second tubular comprising:
  a second carbon steel main body defining a third flow passage in line with the first flow passage and the second flow passage, the second carbon steel main body comprising a first end and a second end, the second carbon steel main body comprising a first beveled edge at the first end, the second carbon steel main body comprising carbon steel; and
  a second corrosion resistant pup defining a fourth flow passage in-line with the first flow passage, the second flow passage, and the third flow passage, the second corrosion resistant pup comprising a corrosion resistant alloy through an entire thickness of the second corrosion resistant pup, the corrosion resistant pup comprising a first end and a second end, the corrosion resistant pup comprising a first beveled edge at the first end of the corrosion resistant pup and a second beveled edge at the second end of the corrosion resistant pup, the corrosion resistant pup being connected to the carbon steel main body by a weld along the beveled edge of the carbon steel main body and the first beveled edge of the second corrosion resistant pup, the second resistant corrosion pup being connected to the first corrosion resistant pup by a weld along the beveled edge of the first corrosion resistant pup and the second beveled edge of the second corrosion resistant pup, the second corrosion resistant pup comprising a metal different from the carbon steel of the second carbon steel main body; and a glass-flake coating along an interior surface of the first tubular; and a galvanic protection system configured to reduce galvanic corrosion between the carbon steel in the first tubular and the second tubular and the first corrosion resistant pup and second corrosion resistant pup.

19. The pipeline of claim 18, wherein the first corrosion resistant pup and the second corrosion resistant pup are each substantially four to seven inches in length.

20. The pipeline of claim 18, wherein the first corrosion resistant pup and the second corrosion resistant pup comprise alloy 625.

\* \* \* \* \*